United States Patent [19]

Morris

[11] Patent Number: 5,408,575
[45] Date of Patent: Apr. 18, 1995

[54] AUTOMOTIVE FAN CONTROLLER

[75] Inventor: Thomas M. Morris, Corpus Christi, Tex.

[73] Assignee: International Resistive Company, Inc., Corpus Christi, Tex.

[21] Appl. No.: 891,200

[22] Filed: Jun. 1, 1992

[51] Int. Cl.⁶ .................. H02P 7/06; B60H 1/00; H01C 7/00
[52] U.S. Cl. ......................... 388/830; 318/268; 318/471; 338/308; 338/325
[58] Field of Search ............ 338/7, 50, 51, 195, 338/295, 308, 322, 325, 327, 330, 333; 318/268, 471; 388/825, 830, 934

[56] References Cited

U.S. PATENT DOCUMENTS

| | | |
|---|---|---|
| 4,196,411 | 4/1980 | Kaufman . |
| 4,318,954 | 3/1982 | Jensen ............... 428/209 |
| 4,460,622 | 7/1984 | Yamaoka et al. ............... 427/79 |
| 5,000,662 | 3/1991 | Yamamoto et al. ........... 417/32 |
| 5,268,665 | 12/1993 | Iwao . |

Primary Examiner—Bentsu Ro
Attorney, Agent, or Firm—G. Turner Moller

[57] ABSTRACT

A vehicle fan motor controller includes a simple planar ceramic base providing a plurality of printed resistors. The resistors include electrically conductive paths printed on the ceramic overcoated with a thick resistive film. The thick film substantially covers the base to promote heat transfer to air moving in the fan duct in which the controller is placed. The thick film resistors are on both sides of the base to reduce overall size and improve heat transfer. A thermal fuse comprising a spring metal member held in a normally closed position by a meltable material opens in response to a predetermined high temperature.

14 Claims, 2 Drawing Sheets

AUTOMOTIVE FAN CONTROLLER

This invention relates to an automotive fan controller of the type positioned in the output air duct of the fan.

Presently used automotive fan controllers are mounted in the output air duct of the fan and incorporate several resistances of different value. The speed of the d.c. fan motor is controlled by placing a selected one of the resistances in circuit with the fan motor. A great deal of development has gone into automotive fan controllers because of the large numbers made each year.

Many of the fan motor controllers presently made incorporate several wound wire resistances and a thermal switch to shut off the fan motor if the temperature in the output air duct gets too high as may be caused by excessive current flow through the motor or air flow through the duct is blocked. These elements are mounted on a frame inserted through an opening in the air duct. Wound wire resistance controllers have a number of disadvantages including relatively high cost, large size and weight, and questionable reliability in high vibration applications such as off road vehicles. Wound wire resistance controllers also have a tendency to snag leaves or lint which can ignite from the high operating temperature of wire resistors in a stalled motor or blocked air duct condition.

There has been a recent tendency to provide fan controllers having ceramic or ceramic clad bases for a variety of reasons. In Japan Laid Open Application 62-88610, there is proposed a fan controller having a ceramic base with several thin film resistors sputtered or vacuum coated on the base. Thin film resistors are typically on the order of 1000 Angstroms or 2,000 atomic units thick. The ceramic base is of intricate shape providing a plurality of heat exchange fins on one side. These heat exchange fins were presumably thought necessary to dissipate the heat generated by electrical current passing through the resistance paths on the ceramic base. In U.S. Pat. No. 5,000,662 there is proposed a fan controller comprising a steel base having a ceramic coating thereon with thick film resistors printed on the ceramic. A thick film resistor is usually printed on the substrate and is at least on the order of about one mil thick. The ceramic coated steel base is said to provide superior strength and heat exchange properties. This invention most nearly relates to these type devices.

These approaches, although superior in many ways to wound wire resistance controllers, have their difficulties. First, the heat exchange fins of Japan 62-88610 are necessarily fragile because they are perpendicular to the base and are of substantial cross-sectional area which can reduce air flow through the duct. Second, the ceramic coated steel base device is strong in some respects but is subject to chipping of the ceramic coating. Third, both devices apply resistors to only one side of the base.

The fan controller of this invention uses a simple planar wholly ceramic base. Thick film resistance paths are printed on both sides of the base and a thermal fuse is incorporated in a critical path to sever the circuit to the fan motor in response to a predetermined high temperature. The base is then bonded to an electrical connector having a flange for mating with the fan duct opening. The resultant fan controller is an inexpensive, rugged, simple, elegant device having no normally moving or expandable parts.

It is an object of this invention to provide an improved automotive fan controller.

Another object of this invention is to provide a fan controller incorporating a planar wholly ceramic base.

Another object of this invention is to provide an inexpensive, rugged, simple, elegant automotive fan controller.

These and other objects of this invention will become more fully apparent as this description proceeds, reference being made to the accompanying drawings and appended claims.

IN THE DRAWINGS

Figure 1:
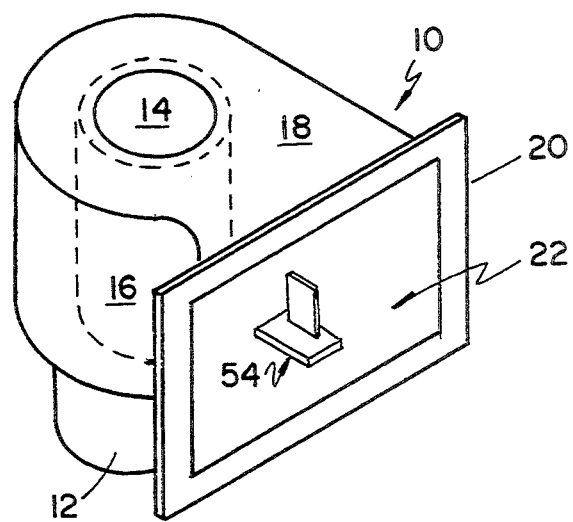
FIG. 1 is a pictorial view of a conventional fan assembly incorporating a fan motor controller of this invention.
Figure 2:
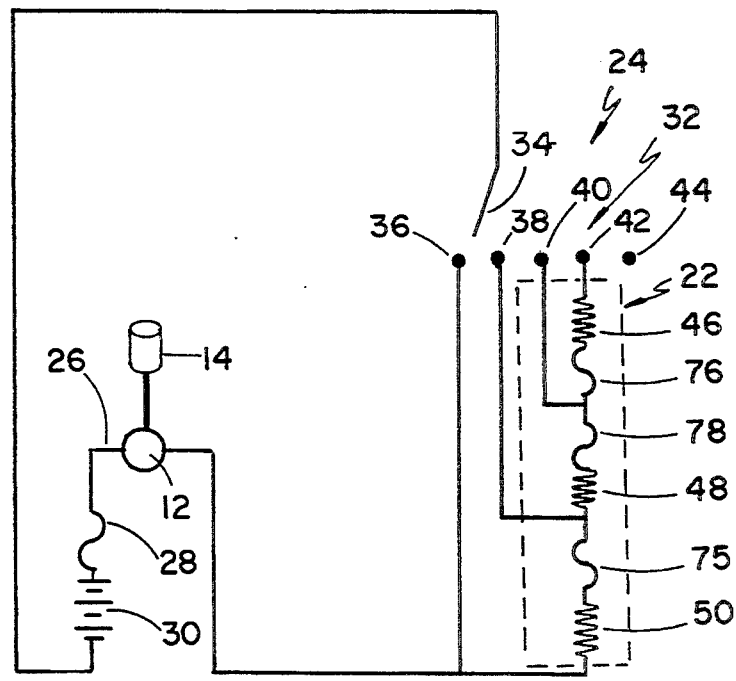
FIG. 2 is a schematic drawing of the fan motor circuit.

Referring to FIGS. 1-2, a conventional vehicular fan assembly 10 comprises a d.c. fan motor 12 driving a blower 14 which may be of any suitable type but is usually of the squirrel cage type positioned in a housing 16 for delivering air through an outlet duct 18 connected by a flange 20 to the ventilation ducts in the vehicle. A resistor assembly 22 is mounted in the outlet duct 18 and is part of a fan motor control circuit 24 shown in FIG. 2.

The fan motor control circuit 24 includes one or more electrical wires or paths 26 connecting the fan motor 12 to a main fuse 28, the vehicle battery or electrical system 30, a fan speed control switch 32 and the resistor assembly 22. The fan control switch 32 typically provides a switch arm 34 movable between a plurality of contacts 36, 38, 40, 42, 44 respectively representing a high fan speed position, a medium high fan speed position, a medium fan speed position, a low fan speed position and an off position. Typically, the contact 36 connects to a relay (not shown) so maximum motor current does not pass through the switch 34. The resistor assembly 22 provides a plurality of resistors 46, 48, 50 to provide the medium high, medium and low fan speeds as shown schematically in FIG. 2. Those skilled in the art will recognize the fan assembly 10 and the fan motor control circuit 24 as typical of those found in conventional vehicles.

Figure 3:
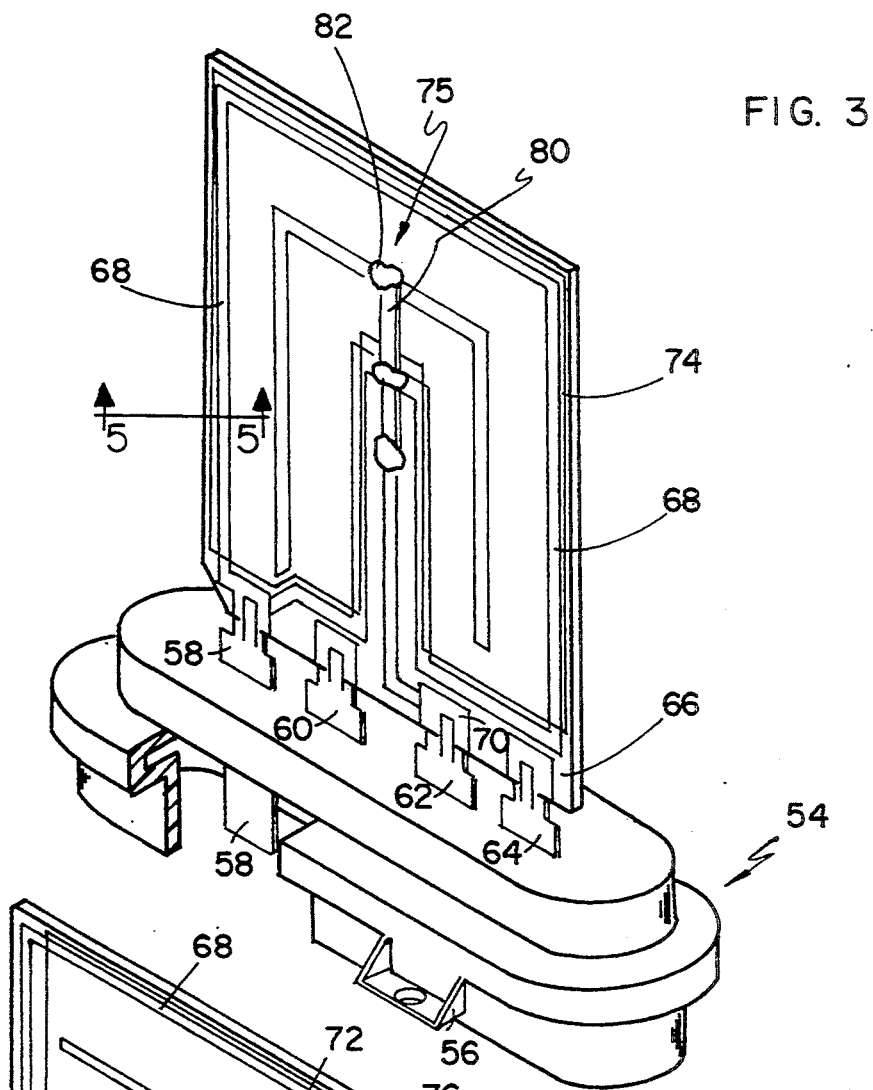
FIG. 3 is an enlarged isometric front view of the fan controller of FIG. 1.
Figure 4:
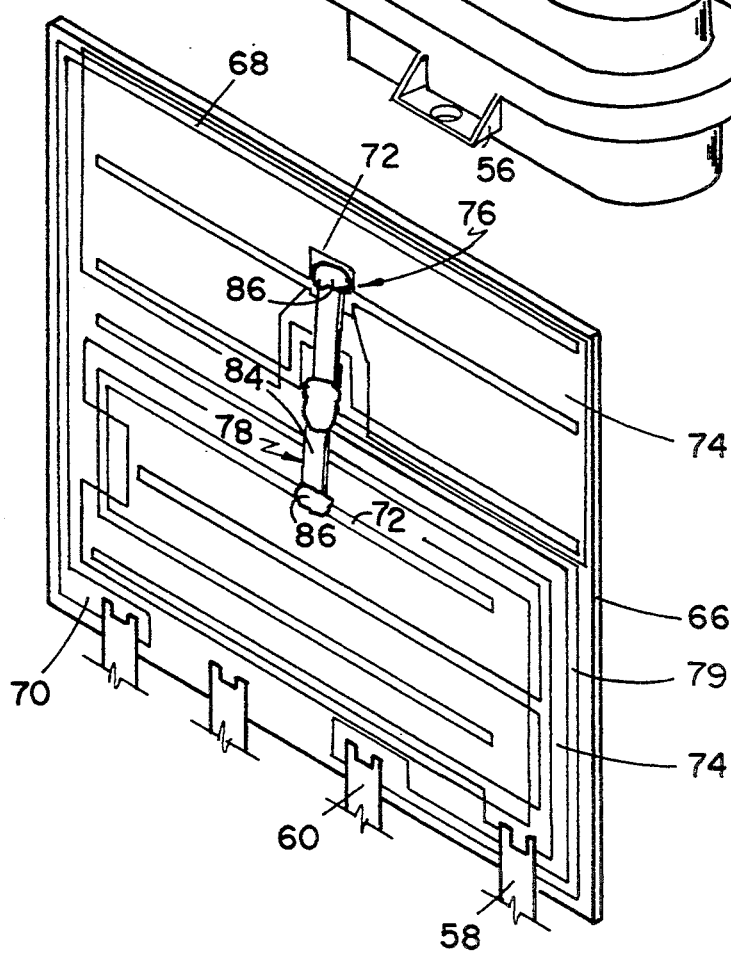
FIG. 4 is an enlarged isometric back view of the fan controller of FIG. 2.

Referring to FIGS. 3 and 4, the resistor assembly 22 of this invention includes a mounting 54 having one or more brackets 56 for receiving a threaded fastener for securing the mounting to the fan duct 18. A series of elongate metal connectors 58, 60, 62, 64 extend upwardly through the mounting 54 for securement to a base 66 and downwardly into a hollow bottom of the mounting 54 to make connection outside the fan duct 18 to the wire 26 leading to the fan motor 12.

The resistor assembly 22 also includes a planar ceramic base 66 of a suitable size and thickness. Preferably, the base 66 is as small as possible, commensurate with its major functions of providing a large enough area to accommodate the necessary resistors and large enough to provide the surface to transfer the heat generated by the resistors 46, 48, 50 to the air flowing in the duct 18. The base is thick enough to provide the necessary strength. Although the size of the base is subject to some variation, the preferred size is 3½–6 square inches in a square or rectangular shape. One typical device is 2 inches by 2¼ inches by 0.05 inches thick. The ceramic bases are typically made in larger sheets of the desired thickness and scribed with a laser and then broken into the desired size.

A series of conductive paths 68 terminating in square connector sections 70 are printed on both sides of the base 66. Typically, this is done by screen printing with conductive inks. A typical conductive ink well known in the art is copper based and suspended in a suitable medium. As shown on the front of the base 66 in FIG. 3, the conductive paths 68 extend from the connector sections 70 at the bottom of the base 66 and are open ended, i.e. they do not themselves make an electrical circuit from one metal connector 58, 60, 62, 64 to another. One or more additional square connector sections 72 are provided for purposes more fully explained hereinafter.

A thick resistive film 74 is then applied to the base 66 in any suitable fashion, as by silk screen printing. In contrast to thin film resistors, which are on the order of 1000 Angstroms or 2,000 atomic layers thick and are applied by sputtering or vacuum deposition, thick film resistors are at least on the order of about one mil thick. A suitable ink or paste used in this process is a tantalum based material disclosed in U.S. Pat. No. 4,205,298. This resistive material is a low value material being about ten ohms per square, meaning that a thick film coating of one unit in length and one unit in width has a resistance of about ten ohms. Because of the geometry of the conductive paths 68, it will be seen that the length of the resistive path is the distance between the conductive paths 68. To provide low resistance values, the length of the resistive path is short compared to its width, which is proportional to the length of the conductive paths 68. To provide low resistance values, the length of the conductive paths 68 must be long, so they wind around on the base 66 and include one or more right angled turns. To provide higher resistance values, the length of the resistive path is relative longer. Thus, by judiciously selecting the shape of the conductive paths 68, resistors of suitable values may be readily produced. Those skilled in the art will recognize the resistor 50 as being on the front of the base 66 as shown in FIG. 3 while the resistors 46, 48 are on the back as shown in FIG. 4.

A thermal fuse 75, 76, 78 is provided for each of the resistors 46, 48, 50. The fuse 75 comprises a spring metal member 80 soldered in the middle to the ceramic base 66 and soldered at each end to one of the intermediate connectors 72 by a material 82 which melts at a predetermined temperature corresponding to the response temperature of the fuse 75. When the material 82 melts or weakens, the metal member 80 springs away from electrical connection with intermediate connectors 72 thereby breaking the electrical circuit at either or both ends of the fuse 75. The fuses 76, 78 comprise a spring metal member 84 soldered in the middle to a conductive path 79 extending under and insulated from the connector 58 into electrical communication with the connector 60. The spring metal member 84 is soldered at each end to the connectors 72 with a meltable material 86 selected to melt or weaken at the response temperature of the fuses 76, 78. When the material 86 at either end of the member 84 melts or weakens, the end of the member 84 springs away from is associated resistor thereby breaking the conductive path as seen most clearly in FIG. 2.

Figure 5:
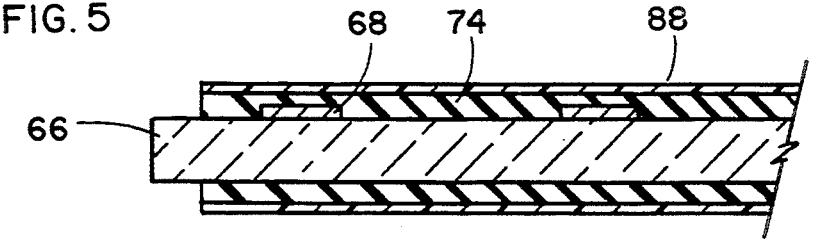
FIG. 5 is a cross-section of the fan controller of FIGS. 3 and 4, taken along line 5—5 of FIG. 3, as viewed in the direction indicated by the arrows.

The resistor assembly 22 is then coated, as by screen printing or the like, with a protective coating 88 (shown only in FIG. 5) which covers the resistive film 74 and most of the conductive paths 68. The coating 88 strengthens the film 74 and the conductive paths 68, protects them against abrasion and impact and does not substantially impede heat flow from the surface of the resistor assembly 22. To these ends, the coating 88 may be of any suitable type, such as a high temperature polymer available from W. R. Grace Chemical Co. and known as Type 3315.

The base 66 is then secured to the housing 54 by crimping the metal connectors 58, 60, 62, 64 and then soldering them to the square connectors 70. A major advantage of the connectors 58, 60, 62, 64 is they are somewhat resilient and separate the base 66 from vibration or shock imparted to the fan duct 18.

The resistor assembly 22 has a number of unusual features. Both sides are substantially covered, e.g. at least 80% covered, with the thick resistive film 74. Because the resistive film 74 extends over such a great area of the base 66, heat transfer to air flowing in the duct 18 is quite efficient. Most of the heat transfer from the assembly 22 is directly from the film to the air rather than through the ceramic base to a heat sink and then to the air. Both sides of the base 66 are provided with resistors thereby, compared to having resistors on only one side, the overall dimensions of the assembly 22 are reduced, heat transfer made more efficient and costs decreased. By providing a larger area for the resistive film 74 and a simple planar ceramic base 66, the heat transfer fins or steel base of the prior art are eliminated.

The operating characteristics of the resistor assembly 22 are impressive. One resistor assembly 22 of 2×2½×0.05 size provides resistive values of 0.3 ohm for the resistor 50, 0.6 ohm for the resistor 48 and 1.85 ohm for the resistor 46. Under normal operating conditions, the temperature of the assembly 22 is about 350° F.

Although this invention has been disclosed and described in its preferred forms with a certain degree of particularity, it is understood that the present disclosure of the preferred forms is only by way of example and that numerous changes in the details of construction and operation and in the combination and arrangement of parts may be resorted to without departing from the spirit and scope of the invention as hereinafter claimed.

I claim:

1. A motor controller comprising
   a base consisting essentially of ceramic material having a planar front section, a planar back section, a ceramic material extending between the front and back sections and a plurality of edges,
   a resistance circuit including
   only one resistor, on the front section, having a segment adjoining each of the base edges, and
   a plurality of resistors, on the back section, at least one of the resistors having a segment adjoining said plurality of the base edges,
   each of the resistors comprising a pair of elongate spaced conductive paths bonded to the ceramic material and a printed resistance film extending across the conductive paths and bonded to the ceramic material; and a fuse operative in response to a predetermined high temperature for interrupting current flow in the circuit.

2. The motor controller of claim 1 wherein the base is free of perpendicular projections.

3. The motor controller of claim 1 wherein the resistive film is of a thickness at least on the order of one mil thick extending across the conductive paths.

4. The motor controller of claim 1 wherein the conductive paths make at least one substantially right angle.

5. The motor controller of claim 1 wherein the fuse is a first fuse on the front of the base connected in circuit with a conductive path on the front of the base and further comprising a second fuse on the back of the base connected in circuit with a conductive path on the back of the base.

6. The motor controller of claim 1 further comprising a mounting having a plurality of elongate connectors providing a first end extending in one direction out of the mounting and a second end, the first end of the connectors being secured to the base and one of the conductive paths.

7. The motor controller of claim 1 wherein the resistive film covers at least 80% of the area of the front and 80% of the back of the base.

8. The motor controller of claim 1 further comprising a fan assembly comprising a direct current motor, a blower driven by the motor, and a housing having the blower therein providing an outlet duct for connection to a vehicle ventilation system.

9. A direct circuit fan motor controller for a vehicle ventilation system, comprising
 a base of ceramic material having a planar front section, a planar back section and ceramic material extending between the from and back sections,
 a resistance circuit including a plurality of resistance paths on the from and back sections, each of the resistance paths comprising a pair of elongate spaced conductive paths extending along and bonded to the ceramic material and a printed resistance film extending across the conductive paths and bonded to the conductive paths and to the ceramic material, the printed resistance film covering at least about 80% of the surface area of the front of ceramic base and 80% of the area of the back of the ceramic base and thereby transferring heat directly to air adjacent the controller; and
 a fuse operative in response to a predetermined high temperature for interrupting current flow in the circuit.

10. The motor controller of claim 9 wherein the resistive film is of a thickness at least on the order of one mil thick extending across the conductive paths.

11. The motor controller of claim 9 wherein the base is of a predetermined size having a first dimension extending in one direction and a second dimension extending across the first dimension, the conductive paths being substantially greater than either the first or second dimension.

12. The motor controller of claim 9 wherein the fuse is a first fuse on the front of the base connected in circuit with a conductive path on the front of the base and further comprising a second fuse on the back of the base connected in circuit with a conductive path on the back of the base.

13. A motor controller comprising
 a base consisting essentially of ceramic material having a planar front section providing a first periphery enclosing a first area, a planar back section providing a second periphery coextensive with the first periphery and enclosing a second area equal to the first area and ceramic material of an area equal to the first area extending between the front and back sections,
 a resistance circuit including
 only one resistor, on the front section, having a segment adjoining each of a plurality of the base edges, and
 a plurality of resistors, on the back section, at least one of the resistors having a segment adjoining said plurality of the base edges,
 each of the resistors comprising a pair of elongate spaced conductive paths bonded to the ceramic material and a printed resistance film extending across the conductive paths and bonded to the ceramic material; and
 a fuse operative in response to a predetermined high temperature for interrupting current flow in the circuit.

14. A motor controller comprising
 a base of ceramic material having a planar front section, a planar back section and wholly ceramic material extending uninterruptedly between the front and back sections and being free of metallic inclusions,
 a resistance circuit including
 one resistor, on the front section, having a segment adjoining each of a plurality of the base edges, and
 a plurality of resistors, on the back section, at least one of the resistors having a segment adjoining said plurality of the base edges,
 each of the resistors comprising a pair of elongate spaced conductive paths bonded to the ceramic material and a printed resistance film extending across the conductive paths and bonded to the ceramic material; and
 a fuse operative in response to a predetermined high temperature for interrupting current flow in the circuit.

* * * * *